(12) United States Patent
Severinsson et al.

(10) Patent No.: US 9,353,847 B2
(45) Date of Patent: May 31, 2016

(54) TORQUE VECTORING DEVICE

(75) Inventors: Lars Severinsson, Hishult (SE); Kristoffer Nilsson, Lund (SE)

(73) Assignee: BorgWarner Torq Transfer Systems AB, Landskrona (SE)

( * ) Notice: Subject to any disclaimer, the term of this patent is extended or adjusted under 35 U.S.C. 154(b) by 0 days.

(21) Appl. No.: 13/991,570

(22) PCT Filed: Dec. 14, 2011

(86) PCT No.: PCT/SE2011/051510
§ 371 (c)(1),
(2), (4) Date: Jul. 2, 2013

(87) PCT Pub. No.: WO2012/082059
PCT Pub. Date: Jun. 21, 2012

(65) Prior Publication Data
US 2013/0281250 A1 Oct. 24, 2013

(30) Foreign Application Priority Data
Dec. 15, 2010 (SE) ...................................... 1051324

(51) Int. Cl.
*F16H 48/36* (2012.01)
*B60K 17/16* (2006.01)
*B60K 6/48* (2007.10)

(52) U.S. Cl.
CPC .............. *F16H 48/36* (2013.01); *B60K 17/165* (2013.01); *B60K 6/48* (2013.01); *B60W 2720/406* (2013.01); *B60Y 2400/804* (2013.01); *F16H 2048/364* (2013.01); *Y02T 10/6221* (2013.01)

(58) Field of Classification Search
CPC . F16H 48/36; F16H 2048/364; B60K 17/046; B60K 17/165
USPC .......................... 475/150, 200, 202, 204, 205
See application file for complete search history.

(56) References Cited

U.S. PATENT DOCUMENTS

| 5,387,161 | A | * | 2/1995 | Shibahata | ......................... | 475/5 |
| 7,425,183 | B2 | * | 9/2008 | Kelley, Jr. | ...................... | 475/204 |
| 8,708,857 | B2 | * | 4/2014 | Winter et al. | .................. | 475/221 |

(Continued)

FOREIGN PATENT DOCUMENTS

| GB | 2348253 | 9/2000 |
| GB | 2466968 | 7/2010 |

(Continued)

OTHER PUBLICATIONS

Japanese Office Action (Notice of Reasons for Rejection) dated Aug. 18, 2015 ; Application No. 2013-544429 ; 2 pages.

(Continued)

*Primary Examiner* — Roger Pang
(74) *Attorney, Agent, or Firm* — BrooksGroup

(57) ABSTRACT

A torque vectoring device (4-18) for two half-axles of a vehicle drive axle, provided with a conventional differential (20-27), through which drive torque is supplied from a propulsion motor, is connected on one hand to one of the half-axles (1), on the other hand to the cage (24) of the differential (20-27). An electric motor (15) of the torque vectoring device is connected via a differential transmission in the form of a planetary gearing (10) to said one of the half-axles (1) and the cage (24). The arrangement is such that the electric motor stands still, when the rotational speed of the half-axle (1) and the cage (24) is the same.

22 Claims, 2 Drawing Sheets

(56) References Cited

U.S. PATENT DOCUMENTS

| | | | |
|---|---|---|---|
| 2002/0061801 A1* | 5/2002 | Amanuma et al. | 475/149 |
| 2004/0048710 A1* | 3/2004 | Tumback | 475/5 |
| 2004/0220011 A1* | 11/2004 | Gumpoltsberger et al. | 475/205 |
| 2006/0079370 A1* | 4/2006 | Kushino | 475/221 |
| 2007/0249456 A1* | 10/2007 | Meixner | 475/150 |
| 2008/0064552 A1* | 3/2008 | Tangl | 475/5 |
| 2009/0182474 A1 | 7/2009 | Ross | |
| 2009/0186734 A1* | 7/2009 | Perkins | 475/5 |
| 2009/0197727 A1 | 8/2009 | Janson | |
| 2010/0234161 A1* | 9/2010 | Kato et al. | 475/205 |
| 2010/0234162 A1 | 9/2010 | Troennberg | |
| 2011/0094806 A1* | 4/2011 | Mack et al. | 180/65.6 |
| 2012/0058855 A1* | 3/2012 | Sten | 475/205 |
| 2014/0315675 A1* | 10/2014 | Watanabe | 475/150 |

FOREIGN PATENT DOCUMENTS

| | | | |
|---|---|---|---|
| JP | 406300095 A | * | 10/1994 |
| JP | 406300096 A | * | 10/1994 |
| JP | 2007139011 A | | 6/2007 |
| JP | 2007177916 | | 7/2007 |
| JP | 2007298138 | | 11/2007 |
| RU | 2266448 C2 | | 12/2005 |
| WO | 2006010186 | | 2/2006 |
| WO | 2010101506 | | 9/2010 |
| WO | WO 2010101506 A1 | * | 9/2010 |

OTHER PUBLICATIONS

Russian Office Action dated Dec. 15, 2015; Application No. 2013124100/11(035555); Applicant: BorgWarner Inc.; 4 pages.

* cited by examiner

TORQUE VECTORING DEVICE

This application claims the benefit of Swedish Application No. 1051324-0 filed Dec. 15, 2010 and PCT Application No. SE2011/051510 filed Dec. 14, 2011.

TECHNICAL FIELD

The present invention relates to torque vectoring device for two half-axles of a vehicle drive axle, provided with a conventional differential, through which drive torque is supplied from a propulsion motor, for example a combustion engine.

BACKGROUND OF THE INVENTION

In a road vehicle, especially a car, it is advantageous to be able to freely distribute drive torque to different wheels in order to enhance the driving dynamics of the vehicle. Devices for accomplishing this desired result are in the art referred to as torque vectoring devices.

Generally speaking, torque vectoring devices may be used in either two-wheel drive vehicles or four-wheel drive vehicles.

A prior torque vectoring device is shown in WO 2010/101506, to which reference is made for a better general understanding of the field of torque vectoring devices and their use in road vehicles. The torque vectoring device of this publication is shown to be used together with an electric propulsion motor, but this is per se no limitation, and the used power source may equally well be a combustion engine.

The torque vectoring device of the publication is constructed to transfer torque between two half-axles of a vehicle drive axle via a differential mechanism and has a torque source in the form of an electric motor.

The main object of the present invention is to attain a torque vectoring device to be used as a unit together with a conventional differential of a vehicle. It is a further object to make this unit compact, light-weight, easier to integrate and cheaper than present torque vectoring devices.

THE INVENTION

This is according to the invention attained in that the torque vectoring device is connected on one hand to one of the half-axles, on the other hand to the cage of the differential or to the other half-axle, and a rotative torque source of the torque vectoring device is connected via a differential transmission in the form of a planetary gearing to said one of the half-axles and the cage or the other half-axle, the arrangement being such that the rotative torque source stands still, when the rotational speed of said one of the half-axles and the cage or the other half-axle is the same.

It is an important aspect that no rotation is imparted to the rotative torque source, when the two driving half-axles of the vehicle rotate with the same speed, and thus that the torque vectoring device according to the invention operates on the rotational speed difference between the two half-axles.

A hollow shaft may in a practical case be connected to the cage of the differential, whereas a shaft connected to said one of the half-axles may extend through the hollow shaft.

A first gear train may be arranged between the shaft and a shaft arrangement connected to a planet carrier of the planetary gearing, the planet carrier carrying planet gears, whereas a second gear train may be arranged between the hollow shaft and a ring wheel of the planetary gearing, a last gear of the second gear train being rotatable on the shaft arrangement.

The rotative torque source may be connected to the sun gear of the planetary gearing.

The rotative torque source is preferably an electric motor. Due to the operating conditions of the torque vectoring device according to the invention, this electric motor may be operated by the ordinary electric system of the vehicle, and no increased voltage level is needed.

A reduction gearing may be arranged between the electric motor and the sun gear of the planetary gearing.

BRIEF DESCRIPTION OF THE DRAWINGS

The invention will be described in further detail under reference to the accompanying drawings, in which.

DESCRIPTION OF EMBODIMENTS

The torque vectoring device according to the invention is intended for a vehicle drive axle, comprising two half-axles connected to a conventional differential, to which drive torque is provided, for example via a cardan shaft in a rear wheel driven car. Each half-axle is provided with a wheel.

Figure 4:
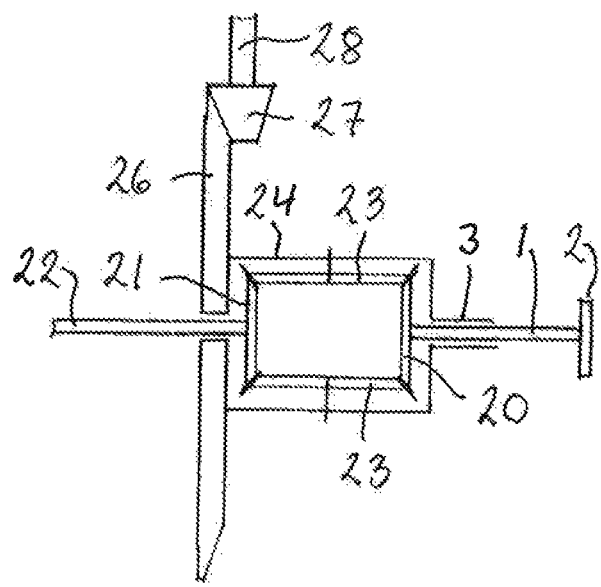
FIG. 4 is a schematic illustration of a conventional differential with means for connecting a torque vectoring device according to the invention.

A shaft 1 is connected to one of the side gears of the differential (shown in FIG. 4). The shaft 1 is connected to a first driving half-axle (not shown) of the vehicle via for example a flange 2. A hollow shaft 3, through which the shaft 1 extends, is connected to the crown wheel or cage of the differential.

A first gear 4 is attached to the shaft 1 and is in engagement with a second gear 5. This in turn is in engagement with a third gear 6, connected via a shaft arrangement 7 to a planet carrier 8 for planet gears 9 in a planetary gearing 10. These gears 4-6 may together be called a first gear train.

As a modification, the first and third gears 4, 6 may be in direct engagement, omitting the second gear 5.

Correspondingly, a fourth gear 11 is attached to the hollow shaft 3 and is in engagement with a fifth gear 12. This in turn is in engagement with a sixth gear 13, rotatable on the shaft arrangement 7 and connected to a ring wheel 14 of the planetary gearing 10. These gears 11-13 may together be called a second gear train.

As a modification (in line with the modification mentioned above) the fourth and sixth gears 11, 13 may be in direct engagement, omitting the fifth gear 12.

A rotative torque source 15, preferably an electric motor, is connected to a sun gear 16 of the planetary gearing 10, for example via a reduction gearing, comprising a smaller seventh gear 17 on the shaft of the electric motor in engagement with a larger eight gear 18 on the shaft of the sun gear 16.

The different gear ratios of the planetary gearing 10 and the first-sixth gears 4-6, 11-13 are so calculated that when the shaft 1 and the hollow shaft 3 are rotating with the same speed, i.e. when the left and right wheels of the vehicle rotate with the same speed, the electric motor 15 does not operate or rotate. A rotational speed differential between the two wheels and thus between the shaft 1 and the hollow shaft 3 may then be counteracted by applying a torque by means of the electric motor 15. Alternatively, the electric motor 15 may be used for creating any desired rotational speed differential between the two wheels.

Figure 1:
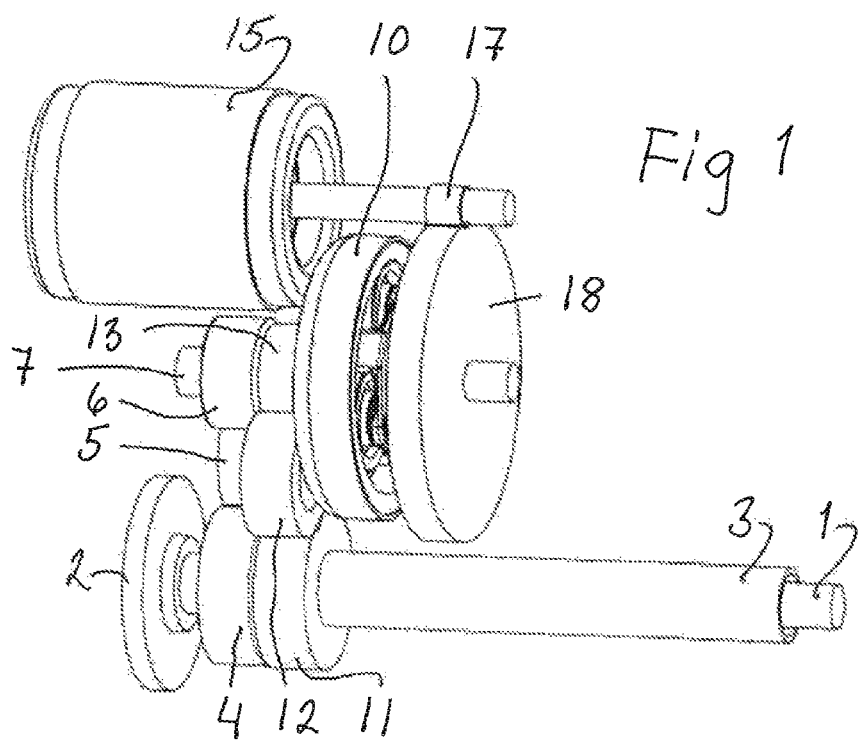
FIG. 1 is an isometric view of a torque vectoring device according to the invention.
Figure 2:
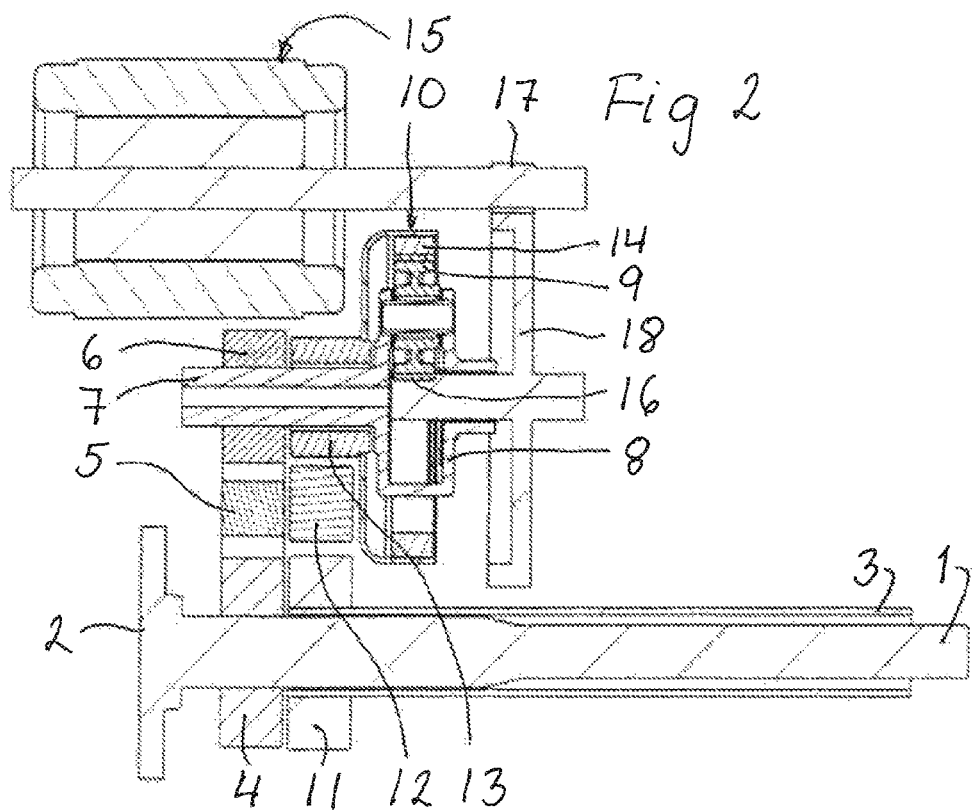
FIG. 2 is a section through the same device.
Figure 3:
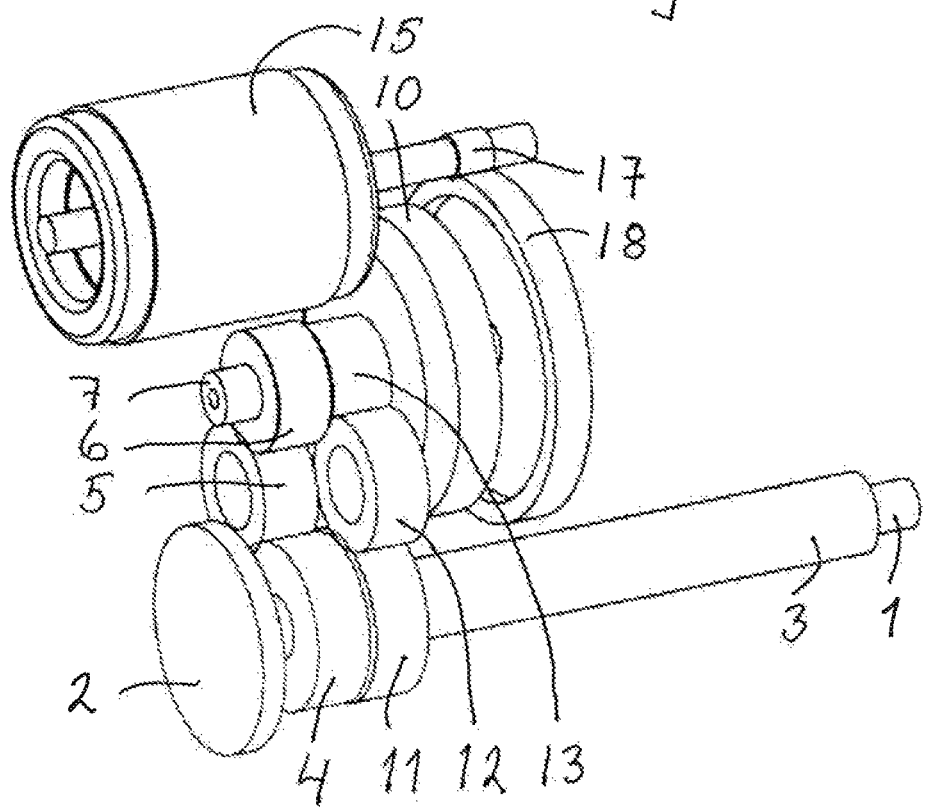
FIG. 3 is an isometric view of the same device from a slightly different angle compared to FIG. 1.

The arrangement and mounting of the torque vectoring device described under reference to FIGS. 1-3 is schematically illustrated in FIG. 4, depicting a conventional differential. Shown therein is the shaft 1, the flange 2 and the hollow shaft 3. The shaft 1 is connected to one side gear 20, whereas a second side gear 21 is connected to a second driving half-axle 22. The side gears 20, 21 are connected to planet gears 23 journalled in a cage 24 of the differential. Connected to the cage 24 is a crown wheel 26 in engagement with a pinion 27 on a cardan shaft 28.

An important advantage with the device according to the invention in comparison with other torque vectoring devices is that it can be built as a self-sustained unit, which can be installed in certain car models but not in others without any other modifications of the vehicle.

Modifications are possible within the scope of the appended claims.

The invention claimed is:

1. A torque vectoring device for an arrangement of two half-axles of a vehicle drive axle, for use with a differential, wherein drive torque is supplied from a propulsion motor by a cardan shaft through the differential to the two half-axles, wherein
the torque vectoring device is a self-sustained unit, meaning that the torque vectoring device is used with the differential and is connected to the arrangement of the two half axles and differential only on one hand to one of the half-axles, and on the other hand to either a cage of the differential or to the other half-axle,
the torque vectoring device comprising a rotative torque source that is engaged via a planetary gearing with: (a) said one of the half-axles; and (b) the cage or the other half-axle,
the arrangement being such that the rotative torque source does not rotate, when a first rotational speed of said one of the half-axles is the same as a second rotational speed of the cage or the other half-axle, and wherein the rotative torque source rotates to provide an input to the planetary gearing based on a rotational speed difference between: (a) said one of the half-axles and (b) the cage or the other half-axle, and
a first driven shaft that is hollow and is connected to the cage of the differential and a second driven shaft that is connected to said one of the half-axles and extends through the first driven shaft, the first and second driven shafts being driven by the torque vectoring device,
wherein the planetary gearing comprises a sun gear, a planet carrier, and a ring wheel, wherein a first gear train is arranged between the second driven shaft and a shaft arrangement connected to the planet carrier of the planetary gearing, the planet carrier carrying planet gears, and a second gear train is arranged between the first driven shaft and the ring wheel of the planetary gearing, a last gear of the second gear train is last in the second gear train toward the ring wheel, the last gear being rotatable on the shaft arrangement.

2. The device according to claim 1, wherein the rotative torque source provides input to the planetary gearing at the sun gear.

3. The device according to claim 2, wherein the rotative torque source is an electric motor, and wherein the electric motor drives the planetary gearing and the first and second gear trains to rotate the first driven shaft in a first direction and to also rotate the second driven shaft in the first direction.

4. The device according to claim 3, wherein a reduction gearing is arranged between the electric motor and the sun gear of the planetary gearing.

5. A device for providing torque vectoring to a driven axle comprising: a differential; an input shaft driving a first half-shaft and a second half-shaft through the differential, wherein the differential includes a cage within which a set of differential gears is journalled, and to which the first half-shaft is connected, the device comprising: a first gear attached to a first driven shaft, wherein the first driven shaft is configured for connection to the second half-shaft; a second driven shaft that is hollow and through which the first driven shaft extends, with a second gear connected to the second driven shaft; a planetary gearing including a planet carrier, a sun gear, and a ring wheel; wherein the first gear is connected via a first gear train, that is separate from the planetary gearing, to the planet carrier, and the second gear is connected via a second gear train, that is separate from the planetary gearing, to the ring wheel; and a rotative torque source that drives the sun gear to drive a rotational speed differential between the first driven shaft and the second driven shaft; wherein the rotative torque source does not rotate, when the first half-shaft and the second half-shaft rotate at an equal speed.

6. The device according to claim 5 wherein the device is a unit that connects to the driven axle only: at the second half-shaft through the first driven shaft; and at the cage through the second driven shaft.

7. The device according to claim 5 wherein the first gear train includes a second gear directly engaged with the first gear, and a third gear directly engaged with the second gear wherein the third gear is connected to the planet carrier through a shaft arrangement; and wherein the second gear train includes a fifth gear directly engaged with a fourth gear and a sixth gear directly engaged with the fifth gear wherein the sixth gear is rotatable on the shaft arrangement, and the sixth gear is fixed to the ring wheel.

8. The device according to claim 7 further comprising a seventh gear driven by the rotative torque source; and an eighth gear engaged with the seventh gear, wherein the eighth gear is fixed on a sun gear shaft, wherein the sun gear shaft is fixed to the sun gear.

9. The device according to claim 8 further comprising a crown wheel that is connected to the cage and is driven by the input shaft.

10. The device according to claim 8 wherein the rotative torque source is an electric motor having a motor shaft extending out of a motor housing, across the planetary gearing and connected to the seventh gear to provide a compact unit.

11. A device for providing torque vectoring of a driven axle, the driven axle having a differential with a cage that is connected to a first half-shaft, the device comprising:
a first driven shaft, wherein the first driven shaft is configured to connect to a second half-shaft of the driven axle;
a second driven shaft that is hollow and through which the first driven shaft extends, the second driven shaft configured to connect to the cage;
a planetary gearing including a planet carrier, a sun gear, and a ring wheel;
a first gear fixed to the first driven shaft and the first gear engaged with the planet carrier through a second gear and a third gear, wherein the second gear is engaged directly with the first gear, and the third gear is engaged directly with the second gear, and the third gear is fixed on a shaft arrangement, the shaft arrangement being fixed to the planet carrier;

a fourth gear fixed to the second driven shaft and the fourth gear engaged with the ring wheel through a fifth gear and a sixth gear, wherein the fifth gear is directly engaged with the fourth gear, and the sixth gear is directly engaged with the fifth gear, wherein the sixth gear is rotatable on the shaft arrangement, and the sixth gear is fixed to the ring wheel; and a motor that drives the planetary gearing to drive a rotational speed differential between the first driven shaft and the second driven shaft.

12. The device according to claim 11 further comprising: a seventh gear driven by the motor; and an eighth gear engaged with the seventh gear, wherein the eighth gear is fixed on a sun gear shaft, wherein the sun gear shaft is fixed to the sun gear.

13. The device according to claim 11 wherein the device is a unit that connects to the driven axle only: at the second half-shaft through the first driven shaft; and at the cage through the second driven shaft.

14. The device according to claim 11 wherein the first gear is positioned adjacent the fourth gear, and wherein the first and fourth gears are configured to rotate with a difference in speed between the first gear and the fourth gear.

15. The device according to claim 12 wherein the eighth gear is larger than the seventh gear to provide a reduction gearing between the motor and the sun gear shaft.

16. The device according to claim 11 further comprising a crown wheel fixed to the cage and wherein the first half shaft extends through the crown wheel.

17. The device according to claim 16 further comprising a cardan shaft with a pinion connected to the cardan shaft and engaged with the crown wheel to drive the crown wheel.

18. The device according to claim 11 wherein the first driven shaft includes a flange for connecting to the second half-shaft.

19. A torque vectoring device for an arrangement of two half-axles of a vehicle drive axle, for use with a differential, wherein drive torque is supplied from a propulsion motor through the differential to the two half-axles,
wherein the torque vectoring device is a self-sustained unit, meaning that the torque vectoring device is used with the differential and is connected to the arrangement of the two half axles and differential only on one hand to one of the half-axles, and on the other hand to either a cage of the differential or to the other half-axle,
the torque vectoring device comprising a rotative torque source that is engaged with: (a) said one of the half-axles; and (b) the cage or the other half-axle,
the arrangement being such that the rotative torque source does not rotate, when a first rotational speed of said one of the half-axles is the same as a second rotational speed of the cage or the other half-axle, and a planetary gearing wherein the rotative torque source rotates to provide an input to the planetary gearing based on a rotational speed difference between: (a) said one of the half-axles and (b) the cage or the other half-axle, and
a first driven shaft that is hollow and is connected directly to the cage of the differential, and a second driven shaft connects to said one of the half-axles and extends through the first driven shaft, a first gear fixed to the first shaft, the second shaft having an end adjacent the first gear with a second gear fixed to the second shaft at the end, the first and second driven shafts being driven by the torque vectoring device through the first and second gears.

20. A torque vectoring device for an arrangement of two half-axles of a vehicle drive axle, for use with a differential, wherein drive torque is supplied from a propulsion motor through the differential to the two half-axles,
wherein the torque vectoring device is connected to the arrangement of the two half axles and differential on one hand to one of the half-axles, and on the other hand to either a cage of the differential or to the other half-axle,
the torque vectoring device comprising a rotative torque source that is engaged via a planetary gearing with: (a) said one of the half-axles; and (b) the cage or the other half-axle, the planetary gearing having an output side and an input side, the rotative torque source providing input through the input side,
the arrangement being such that the rotative torque source does not rotate, when a first rotational speed of said one of the half-axles is the same as a second rotational speed of the cage or the other half-axle, and wherein the rotative torque source rotates to provide an input to the planetary gearing based on a rotational speed difference between: (a) said one of the half-axles and (b) the cage or the other half-axle, and
a first driven shaft that is a hollow tube that extends from the output side of the planetary gearing to beyond the input side of the planetary gearing, and is connected to the cage of the differential, and a second driven shaft that is connected to said one of the half-axles and extends through the first driven shaft, the first and second driven shafts being driven by the torque vectoring device.

21. A torque vectoring device for an arrangement of two half-axles of a vehicle drive axle, for use with a differential, wherein drive torque is supplied from a propulsion motor through the differential to the two half-axles,
the torque vectoring device comprising a rotative torque source that is engaged with: (a) said one of the half-axles; and (b) the cage or the other half-axle,
the arrangement being such that the rotative torque source does not rotate, when a first rotational speed of said one of the half-axles is the same as a second rotational speed of the cage or the other half-axle, and a planetary gearing wherein the rotative torque source rotates to provide an input to the planetary gearing based on a rotational speed difference between: (a) said one of the half-axles and (b) the cage or the other half-axle, and
a first driven shaft that is in the shape of a hollow extending tube and that has a first end connected directly to the cage of the differential and a second end upon which a first gear is mounted, and a second driven shaft upon which a second gear is mounted and that is connected between said one of the half-axles and the differential and extends through the first driven shaft, the first and second driven shafts being driven by the torque vectoring device through the first and second gears, respectively.

22. A torque vectoring device for an arrangement of two half-axles of a vehicle drive axle, for use with a differential, wherein drive torque is supplied from a propulsion motor through the differential to the two half-axles,
wherein the torque vectoring device is a self-sustained unit, meaning that the torque vectoring device is used with the differential and is connected to the arrangement of the two half axles and differential only on one hand to one of the half-axles, and on the other hand to either a cage of the differential or to the other half-axle, the torque vectoring device comprising a rotative torque source that is engaged via a planetary gearing with: (a) said one of the half-axles; and (b) the cage or the other half-axle, the arrangement being such that the rotative torque source does not rotate, when a first rotational speed of said one of the half-axles is the same as a second rotational speed of the cage or the other half-axle, and wherein the rotative torque source rotates to provide an input to the planetary gearing based on a rotational speed difference between: (a) said one of the half-axles and (b) the cage or the other half-axle, and a first driven shaft that is in the shape of a hollow extending tube and is connected to the cage of the differential, and a second driven shaft that is connected to said one of the half-axles and extends through the first driven shaft, the first and second driven shafts being driven by the torque vectoring device, wherein the rotative torque source is disposed parallel to the first and second driven shafts and the planetary gearing is disposed completely between the rotative torque source on one side and the first and second driven shafts on another side.

\* \* \* \* \*